United States Patent [19]
Ueda et al.

[11] Patent Number: 4,841,214
[45] Date of Patent: Jun. 20, 1989

[54] CONTROL DEVICE FOR A STEPPING MOTOR

[75] Inventors: Michio Ueda, Gamagori; Satoshi Shibata, Chita, both of Japan

[73] Assignee: Brother Kogyo Kabushiki Kaisha, Aichi, Japan

[21] Appl. No.: 139,205

[22] Filed: Dec. 29, 1987

[30] Foreign Application Priority Data

Dec. 30, 1986 [JP] Japan .............................. 61-199093[U]

[51] Int. Cl.$^4$ ................................................. H02P 8/00
[52] U.S. Cl. ....................................... 318/696; 318/685
[58] Field of Search ................................. 318/696, 685

[56] References Cited

U.S. PATENT DOCUMENTS 4,143,980  3/1979  Giebler et al. ....................... 400/322
4,311,398  1/1982  Gerjets ................................. 400/70
4,612,588  9/1986  Tsukahara ....................... 318/685 X

FOREIGN PATENT DOCUMENTS 2906135  2/1979  Fed. Rep. of Germany .

Primary Examiner—William M. Shoop, Jr.
Assistant Examiner—Saul M. Bergmann
Attorney, Agent, or Firm—Oliff & Berridge

[57] ABSTRACT

A control device is provided for a stepping motor which connects with a drive system comprising a somewhat resilient member exerting a rebound force, such as a gear for the platen or a wire for the carriage in an electronic typewriter. When the stepping motor stops rotating in a determined direction, the control device rotates the stepping motor in the opposite direction for a minimum step to compensate for the unnecessary reverse rotation of the stepping motor caused by the resiliency in the drive system. Therefore, a transmission shaft of the stepping motor is freed from such an undesired external force as the resiliency of other parts and the stepping motor is always stopped in a position appropriate for a subsequent rotation.

7 Claims, 4 Drawing Sheets

CONTROL DEVICE FOR A STEPPING MOTOR

BACKGROUND OF THE INVENTION

The present invention relates to a control device for a stepping motor.

One conventional stepping motor connects with a drive system including a member which rebounds resiliently for a small distance in a direction opposite to that of its driven direction owing to its resiliency when an external driving force is interrupted. This kind of stepping motor is used in an electronic typewriter, for example, so as to rotate the platen.

Referring to FIG. 5, a gear 6 engages with another gear 5 of the conventional stepping motor so that a rotational axis 4 of the stepping motor is connected with a transmission shaft (not shown) of the platen. A tooth 6a of the gear 6 is bent due to the load of the platen when the stepping motor is stopped. If the resiliency of the resilient tooth 6a is greater than a restraining force of the stepping motor, the gear 5 is rotated backward, as shown by an arrow A in the drawing. Under such condition, the stepping motor stops with the rotor displaced from an appropriate position. For this reason, the control device for the stepping motor with a weak restraining force, in particular, cannot sequentially rotate the rotor properly, thus sometimes resulting in step-out. The same problem occurs with regard to a stepping motor which moves the carriage of the typewriter back and forth by means of a resilient member such as a wire.

SUMMARY OF THE INVENTION

It is accordingly an object of the present invention to provide a control device for a stepping motor which prevents the stepping motor from step-out resulting from the rotor being rotated backward to be displaced relative to the stator in reaction to the load at the moment the stepping motor is stopped.

This object is attained by a control device for a stepping motor comprising: drive means connected to and driven by the stepping motor and including a member which is restored in a direction opposite to that of its previous driven direction due to its resiliency when the driving force of the stepping motor is interrupted; and stop control means for controlling the stepping motor by outputting a reverse control signal which rotates the stepping motor at least a minimum step in a direction opposite to that of a previous direction of rotation so as to offset the resiliency of the member when the previous rotation stops, thereby avoiding step-out of the stepping motor.

BRIEF DESCRIPTION OF THE DRAWINGS

The invention will now be described with reference to the accompanying drawings, in which.

DETAILED DESCRIPTION OF THE PREFERRED EMBODIMENT

Hereinafter, the present invention will be explained according to a control device for stepping motors installed in an electronic typewriter with reference to FIGS. 1 through 4.

Figure 2:
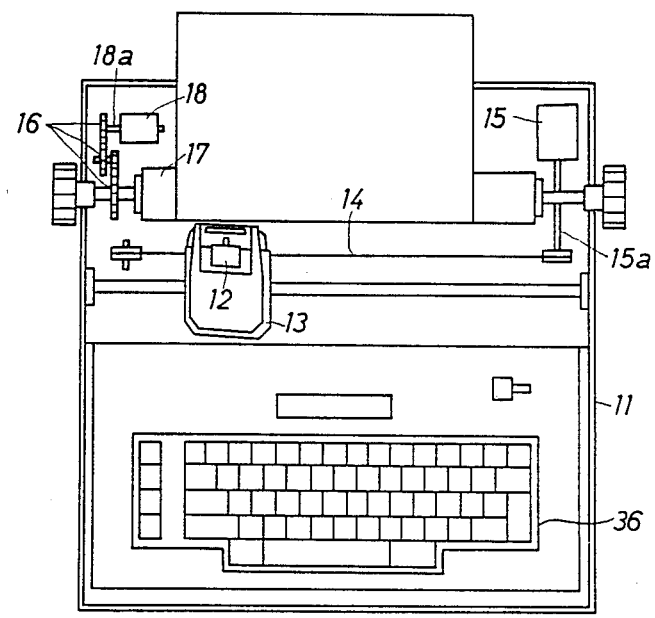
FIG. 2 is a plan view of an electronic typewriter.

Referring to FIG. 2, an electronic typewriter 11 has a carriage 13 provided with a print head 12, a carriage drive stepping motor 15, a platen 17, and a platen drive stepping motor 18, and a keyboard 36. The carriage drive stepping motor 15 moves the carriage 13 back and forth via a wire 14 and a transmission shaft 15a. The platen drive stepping motor 18 rotates the platen 17 via several gears 16, made of synthetic resin, and a transmission shaft 18a.

Figure 1:
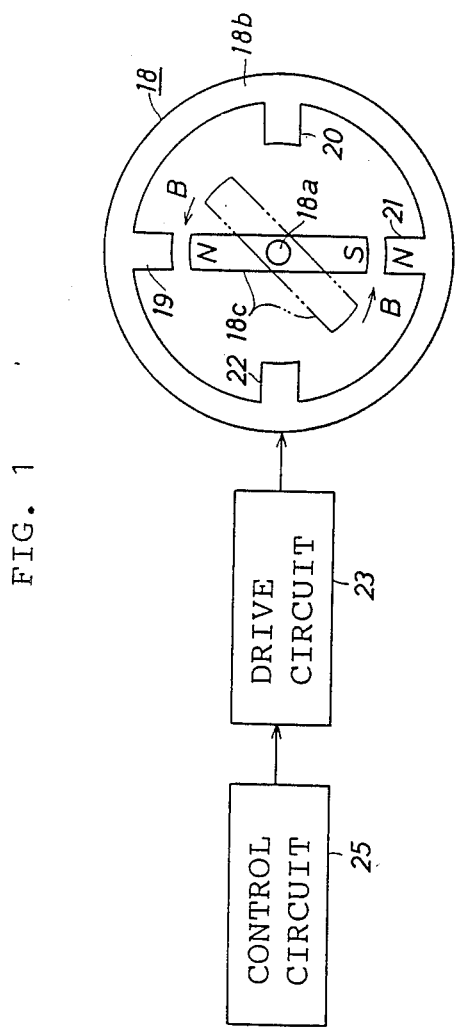
FIG. 1 is a schematic illustration of a control device and a stepping motor.

Referring to FIG. 1, an explanation will now be given for an electric structure of the control device which controls the platen drive stepping motor 18. With regard to the control device for the carriage drive stepping motor 15, however, a detailed explanation is omitted, since it has the same electric structure as that for the platen drive stepping motor 18.

Figure 6:
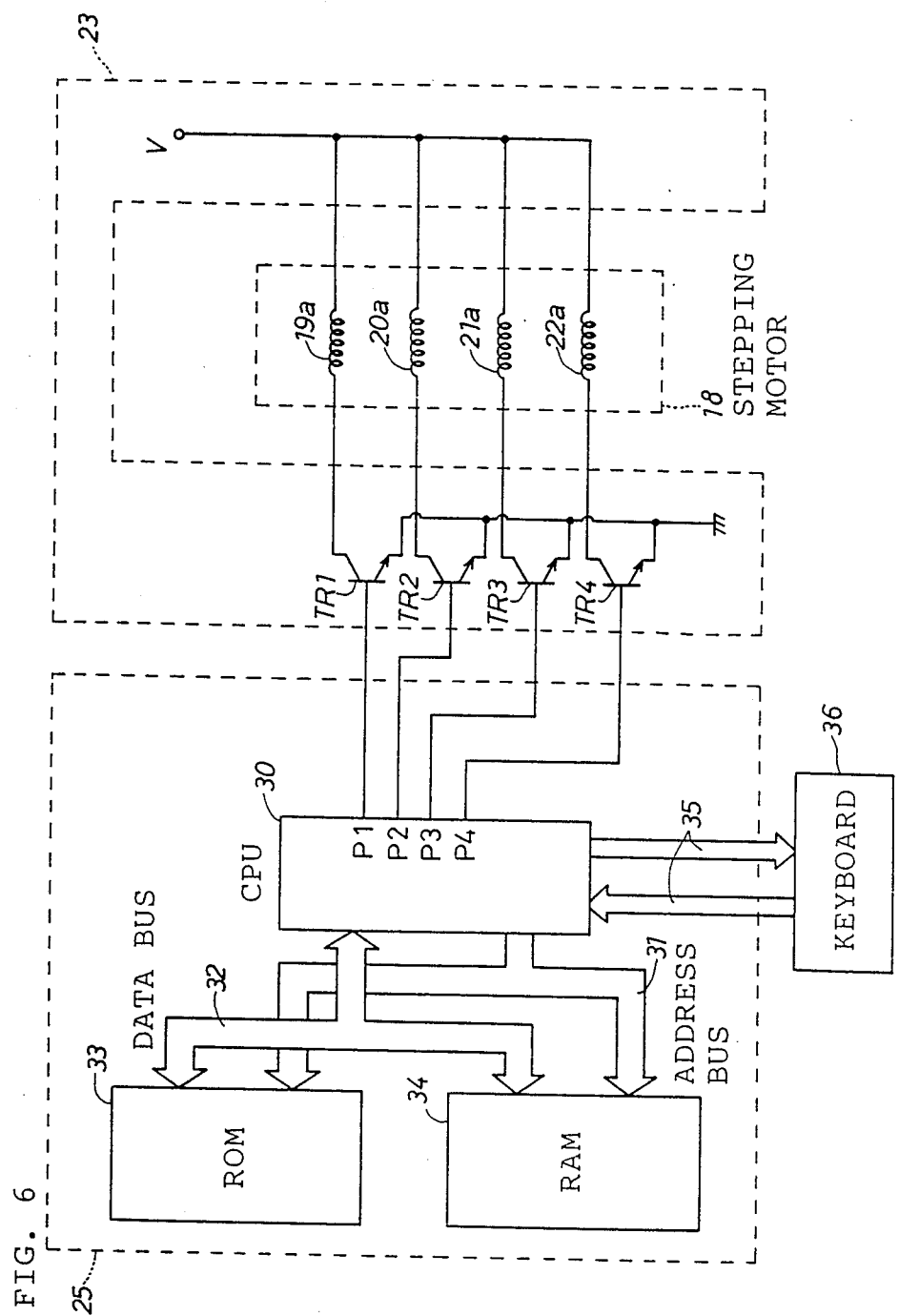
FIG. 6 is a block diagram of a drive circuit 23 and a control circuit 25.

A stator 18b of the stepping motor 18 is provided with four magnetic poles 19, 20, 21 and 22, each comprising one of excitation coils 19a, 20a, 21a and 22a which are shown in FIG. 6 and will be explained later. Each of the magnetic poles 19-22 is connected with a drive circuit 23 which provides each of the coils 19a-22a on the magnetic poles 19-22 with a drive signal so as to energize the coil. A control circuit 25 outputs control signals to the drive circuit 23, which sequentially energizes two of the four coils 19a-22a on the magnetic poles 19-22 in the conventional two-phase-on drive method so as to rotate a rotor 18c of the stepping motor 18. More specifically, the control circuit 25 supplies the drive circuit 23 with the control signals SG1, SG2, SG3 and SG4 for energizing the coils 19a-22a on the magnetic poles 19-22, respectively, according to the drive sequence shown in FIG. 3. The control circuit 25 also has a stoppage control function as for the stepping motor 18. To elaborate, as soon as the stepping motor 18 completes the rotation in a determined direction, the control circuit 25 rotates the rotor 18c in the opposite direction for a controllable minimum step.

Referring to FIG. 6, the drive circuit 23 and the control circuit 25 will be described in more detail. The drive circuit 23 comprises transistors TR1, TR2, TR3 and TR4 each having a common emitter. Collectors of the transistors TR1, TR2, TR3 and TR4 are connected with the coils 19a, 20a, 21a and 22a of the stepping motor 18, respectively, which are connected with a voltage terminal V. The control circuit 25 comprises a well-known CPU 30 connected with a ROM 33 and a RAM 34 via address bus 31 and data bus 32 and with the keyboard 36 via a signal line 35. Output ports P1, P2, P3 and P4 of the CPU 30 are connected with base terminals of the transistors TR1, TR2, TR3 and TR4 of the drive circuit 23. While the output port P1 is being supplied with low voltage, for example, the corresponding transistor TR1 is in OFF-state wherein no current runs through the coil 19a or energizes it. On the other hand, while the output port P1 is being supplied with high voltage, the transistor TR1 is in ON-state wherein current runs through the coil 19a to energize it. The other coils 20a, 21a and 22a are just the same as the above-mentioned coil 19a.

The operation of the above-stated control device will be described in detail. Now, the platen 17 of the electronic typewriter 11 is supposed to be stopped after a determined amount of rotation. According to the program stored in the ROM 33 of the control circuit 25, the output ports P1-P4 output the control signals SG1-SG4 to the drive circuit 23, as shown in the drive sequence in FIG. 3, thereby energizing the coils 19a-22a on the magnetic poles 19-22. When the stepping motor 18 completes the determined rotation of the platen 17 by energizing the coils on the magnetic poles 21 and 22 and positioning the rotor 18c as indicated by an interrupted line in FIG. 1, the control circuit 25 supplies the drive circuit 23 with the control signal SG3, as shown by a hatch in FIG. 3, in order to energize only the coil on the magnetic pole 21.

As a result of the energization of the magnetic pole 21, the rotor 18c is rotated half a step backward, i.e., in the direction of an arrow B. Thus, the rotor 18c is moved from the position shown by the interrupted line into a position shown by a solid line, where the rotor 18c is to stay. The rotation angle of this rotor's reverse rotation is large enough to compensate for a reverse rotation in the direction of arrow B caused by the resiliency of the resilient gear 16 which has been bent by the load of the platen 17. Moreover, the rotation angle of the rotor's reverse rotation is smaller than an angle corresponding to the backlash of the gear 16. Therefore, the reverse rotation of the rotor 18c for half a step does not cause the platen 17 to rotate reversely. The next rotation of the stepping motor 18 is executed without step-out, positioning the rotor 18c at an appropriate position relative to the stator 18b.

As described above, the rotor 18c of the stepping motor 18 is rotated backward half a step at the end of the rotation. Thus, the control circuit 25 is to start the next rotation of the stepping motor 18 considering the reversed half step of the rotor 18c so that the platen 17 is accurately rotated a determined amount.

Figure 3:
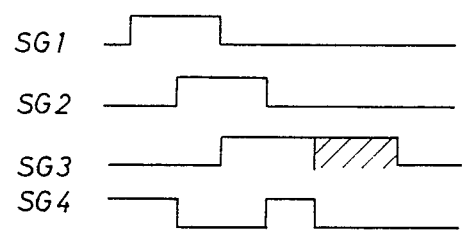
FIGS. 3 and 4 are timing charts each showing the drive sequence of the phases.
Figure 4:
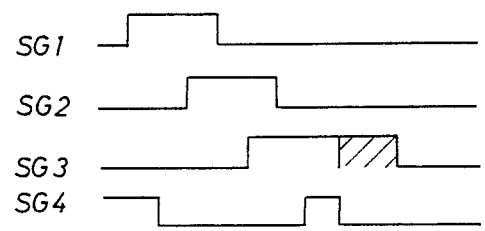
Figure 5:
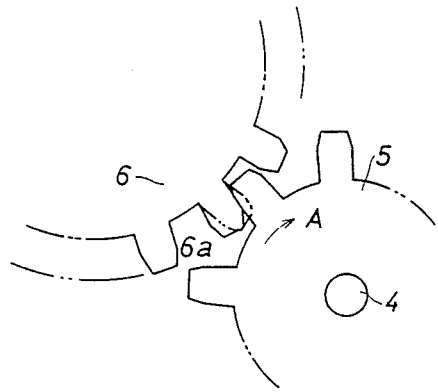
FIG. 5 illustrates a gear portion of a conventional stepping motor.

According to the above-stated embodiment, the control circuit 25 supplies the drive circuit 23 with the control signals SG1-SG4 so as to activate the stepping motor 18 in the two-phase-on drive method as shown by the drive sequence in FIG. 3. Alternatively, the control circuit 25 may supply the control signals SG1-SG4 to activate the stepping motor 18 in a half-step drive method as shown by the drive sequence in FIG. 4, resulting in the rotor 18c being rotated backward for one step at the end of the rotation in a determined direction.

Since the carriage drive stepping motor 15 activating the carriage 13 is controlled in the same manner as the platen drive stepping motor 18, it cancels a reverse rotation caused by the resiliency of the wire 14 which has been extended by the load of the carriage 13. Therefore, the next rotation of the stepping motor 15 is executed without stepout, positioning the rotor at an appropriate position relative to the stator.

According to the present embodiment, the stepping motor is rotated backward either half a step or one step. Alternatively, the number of steps to be reversed may vary in response to the strength of the resiliency and the load.

Obviously, many modifications and variations of the present invention are possible with regard to the above teachings. It is therefore to be understood that within the scope of the appended claims, the invention may be practiced other than as specifically described.

What is claimed is:

1. A control device for a stepping motor comprising:
    drive means connected to and driven by the stepping motor and including a resilient member which is restored in a direction opposite to its previous driven direction due to its resiliency when the driving force of a rotor of the stepping motor is interrupted, a restraining force for holding the rotor of the stopped stepping motor being smaller than a resilient force applied to the rotor of the stepping motor due to the resiliency of the resilient member; and
    stop control means for controlling the stepping motor by outputting a reverse control signal which rotates the stepping motor at least a minimum step in a direction opposite to a previous direction of rotation so as to offset the resiliency of the member when the previous rotation stops, thereby avoiding stepout of the stepping motor.

2. A control device for a stepping motor according to claim 1 wherein the member is composed of a plurality of gears and the opposite control signal is provided such that the reverse rotation of the stepping motor offsets the resiliency of the plurality of gears.

3. A control device for a stepping motor according to claim 1 wherein the member is composed of a resilient wire and the opposite control signal is provided such that the reverse rotation of the stepping motor offsets the resiliency of the wire.

4. A control device for a stepping motor according to claim 1 wherein the minimum step is half a step in two-phase-on drive of the stepping motor.

5. A control device for a stepping motor according to claim 1 wherein the minimum step is one step in half-step-drive of the stepping motor.

6. A control device for a stepping motor according to claim 1 wherein the stop control means stops an output of a control signal to the stepping motor after outputting the reverse control signal, the restraining force being generated by a magnetic force of the rotor of the stepping motor.

7. A control device for a stepping motor according to claim 1 wherein the reverse control signal instructs the stepping motor to execute a single phase excitation.

* * * * *